US012323777B2

(12) United States Patent
Degraeve et al.

(10) Patent No.: US 12,323,777 B2
(45) Date of Patent: Jun. 3, 2025

(54) LOUDSPEAKER CIRCUITRY

(71) Applicant: GP Acoustics International Limited, Pak Shek Kok (HK)

(72) Inventors: Sebastien Degraeve, Maidstone (GB); Jack Anthony Oclee-Brown, Staplehurst (GB)

(73) Assignee: GP Acoustics International Limited, Pak Shek Kok (HK)

(*) Notice: Subject to any disclaimer, the term of this patent is extended or adjusted under 35 U.S.C. 154(b) by 193 days.

(21) Appl. No.: 17/982,235

(22) Filed: Nov. 7, 2022

(65) Prior Publication Data

US 2023/0179916 A1 Jun. 8, 2023

(30) Foreign Application Priority Data

Dec. 2, 2021 (GB) ..................................... 2117411

(51) Int. Cl.

*H04R 3/00* (2006.01)
*H04R 3/08* (2006.01)
*H04R 9/02* (2006.01)
*H04R 9/06* (2006.01)

(52) U.S. Cl.

CPC ............... *H04R 3/002* (2013.01); *H04R 3/08* (2013.01); *H04R 9/025* (2013.01); *H04R 9/063* (2013.01)

(58) Field of Classification Search

CPC .. H04R 9/025; H04R 9/063; H04R 2209/041; H04R 1/22; H04R 3/00
See application file for complete search history.

(56) References Cited

U.S. PATENT DOCUMENTS

| | | | | |
|---|---|---|---|---|
| 3,838,216 | A | 9/1974 | Watkins | |
| 6,259,799 | B1 | 7/2001 | Suzuki et al. | |
| 2006/0188126 | A1* | 8/2006 | Andersen | H04M 1/03 381/396 |
| 2010/0195863 | A1* | 8/2010 | Fujimoto | H04R 9/041 381/409 |
| 2021/0235182 | A1* | 7/2021 | Ricci | H04R 1/1083 |

FOREIGN PATENT DOCUMENTS

| | | | |
|---|---|---|---|
| GB | 2126044 | A | 3/1984 |
| JP | S61161895 | A | 7/1986 |
| JP | H11146486 | A | 5/1999 |

OTHER PUBLICATIONS

Search Report issued for GB patent application Serial No. 2117411.5 dated Mar. 23, 2022.

* cited by examiner

*Primary Examiner* — Kile O Blair
(74) *Attorney, Agent, or Firm* — Westman, Champlin & Koehler, P.A.; Z. Peter Sawicki; Amanda M. Prose

(57) ABSTRACT

Electrical circuitry adapted to drive a dual-coil loudspeaker having a primary voice coil and a second voice coil connected in parallel with the primary voice coil, the second voice coil being in series with an LC resonant circuit of impedance $Z_{mf}$, further comprising an inductance compensation filter of impedance $Z_{if}$ in parallel with the LC resonant circuit.

11 Claims, 6 Drawing Sheets

LOUDSPEAKER CIRCUITRY

CROSS REFERENCE TO RELATED APPLICATION

This application claims priority to and benefits of GB Patent Application No. 2117411.5, filed Dec. 2, 2021, the content of which is hereby incorporated by reference in its entirety.

FIELD OF THE INVENTION

The present invention relates to the field of loudspeakers, and in particular to electrical circuitry for loudspeakers and to loudspeakers incorporating such circuitry.

BACKGROUND ART

There are many conventional types of acoustic loudspeakers which employ moving voice coils as electromagnetic vibrators to drive a diaphragm from the rear and to radiate acoustic waves from the front surface of the diaphragm; the present invention is principally concerned with "dual-coil" loudspeaker drivers, that is to say loudspeakers which have two, superimposed voice coils with the same drive system. Such a dual-coil loudspeaker driver was the subject of U.S. Pat. No. 3,838,216, in which a conventional voice coil was supplemented with a second voice coil, and is shown schematically in FIG. 1(*a*) and its equivalent electrical circuit in FIG. 1(*b*). The second voice coil is connected in parallel with the conventional voice coil, and is in series with a network of impedance $Z_{mf}$, which is an LC resonant circuit comprising in series an inductor L and a capacitor C.

If properly tuned, the LC circuit cancels the effect of the back electromotive force at the fundamental resonance of the loudspeaker, allowing a greater output sound pressure level (SPL) for the same bandwidth; or equivalently, more bass extension for the same SPL. FIG. 2 shows a comparison of the SPL between a conventional driver and a dual-coil driver used in the same closed box system, showing that the dual-coil system is 2 dB louder than the conventional system in this example.

FIG. 3 shows the same comparison from an impedance point of view, the LC circuit causes the large peak around the fundamental resonance of the loudspeaker to disappear and the resulting impedance is equivalent to a pure resistance whose value is not below the recommended minimum impedance for a loudspeaker, typically 3.2 ohms. It is important to have a low impedance target, and driver resistance is minimised so as to enable voltage sensitivity (how loud the speaker can be without acoustic distortion) to be maximised.

U.S. Pat. No. 3,838,216 ignores the effect of voice coil inductance and treats the two voice-coils as pure resistances. However, in practical implementations, the effect of the inductances of the voice coils causes a large dip in the electrical load impedance in the passband, leading sometimes to amplifier overload and failure. FIG. 4 shows that the minimum impedance of this particular dual-coil system is 2.5 ohms at 140 Hz, which is well below the recommended minimum impedance for a loudspeaker, typically 3.2 ohms. One way of addressing this is by cancelling the inductive rise of the impedance by adding a so-called "Zobel network" $Z_z$—typically a capacitor in series with a resistor—in parallel with the primary voice coil and in parallel with the secondary voice coil, the resonant circuit and the inductance compensation filter, as illustrated in FIG. 5. FIG. 6 is a plot of the loudspeaker impedance with and without a Zobel network, and shows that, although the Zobel network cancels the inductance at high frequencies, the minimum impedance of this particular dual-coil system drops to 2.2 ohms at 140 Hz, which is even lower than if no Zobel network is used. There is a need to avoid the impedance dip associated with the inductances of the voice coils in a dual-coil driver system, while maintaining the same or better output performance as predicted in U.S. Pat. No. 3,838,216.

SUMMARY OF THE INVENTION

The present invention is predicated on the realisation that a relatively simple inductance compensation filter can be used with a dual-coil loudspeaker driver and significantly improve its overall performance compared to conventional systems.

The present invention therefore provides electrical circuitry adapted to drive a dual-coil loudspeaker having a primary voice coil and a second voice coil connected in parallel with the primary voice coil, the second voice coil being in series with a resonant circuit of impedance $Z_{mf}$ further comprising an inductance compensation filter of impedance $Z_{if}$ in parallel with the resonant circuit (which may be an LC or an RLC circuit). The addition of the inductance compensation filter not only cancels the effect of the inductance (the monotonic rise at high frequencies), but also and more importantly removes the dip in the impedance as shown in FIG. 6; this effect is shown in FIG. 8 and described further below.

Preferably, the impedance of the inductance compensation filter is given by $$Z_{if}=R_{el}^2/j\omega L_{el}(\omega)$$

where $R_{el}$ is the resistance of the primary voice coil, j is the imaginary operator, ω is the circular frequency and $L_{el}(\omega)$ is the complex frequency-dependent inductance of the primary voice coil, and where $$L_{el}(\omega)=(Z_{eb}(\omega)-Z_{eb}(0))/(j\omega)$$

and $Z_{eb}(\omega)$ is the frequency dependent blocked impedance and $Z_{eb}(0)$ is the DC blocked impedance.

The impedance of the resonant circuit is suitably given by $$Z_{mf}=Z_m(R_{el}/B\ell_l)^2$$

where $Z_m$ is the mechanical load seen by the loudspeaker, $R_{el}$ is the resistance of the primary voice coil and $B\ell_l$ is the force factor of the primary voice coil.

The inductance compensation filter may comprise a capacitor C1, or a capacitor C1 in series with a resistor R1. The simplest circuit uses a capacitor alone, but sometimes a resistor in series with the capacitor is used for fine tuning.

In some circumstances the inductance in the dual-coil driver is frequency-dependent, and in such cases a semi-inductance model can be used. The semi-inductance model may be effected by the inductance compensation filter comprising a capacitor C1 in series with a resistor R1 and, in series, a further capacitor C2 in parallel with a resistor R2. Additionally, the inductance compensation filter may further comprise, in series, a further capacitor C3 in parallel with a further resistance R3.

The circuitry may further comprise a voltage divider R4-R5 located in series between the parallel-connected resonant circuit and the inductance compensation filter, and the second voice coil. The dual-coil arrangement gives an opportunity unachievable with a conventional single coil driver: the control of the Q-factor without changing the input impedance. This allows control of the pressure response at low frequency, giving more flexibility for the user in locating the loudspeaker in a room for example.

The electrical circuitry may additionally comprise a Zobel network in parallel with the parallel drivers for the primary and the secondary voice coils, compensation circuit and voltage divider. This is used to compensate for any residual effects of the inductance.

The primary and second voice coils may be coaxial and share the same magnetic gap, as in U.S. Pat. No. 3,838,216. Alternatively the primary and second voice coils may be coaxial and operate in separate magnetic gaps (where the second driver is behind the primary driver and operates rearwardly so as to use the same motor system). Alternatively the primary and secondary voice coils may be separate, in an isobaric arrangement.

BRIEF DESCRIPTION OF THE DRAWINGS

The invention will now be described by way of example and with reference to the accompanying figures, in which.

DETAILED DESCRIPTION OF THE EMBODIMENTS

FIGS. 1 to 6 relate to the prior art and are described in the introduction above.

Figure 1A:
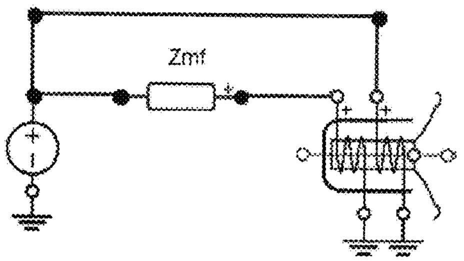
Fig 1(a) PRIOR ART
FIG. 1(*a*) is a schematic illustration of the dual-coil drive arrangement in U.S. Pat. No. 3,838,216, and FIG. 1(*b*) is the equivalent electrical circuit.
Figure 1B:
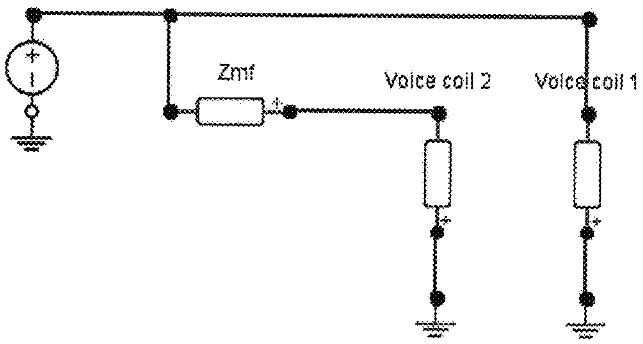
Fig 1(b) PRIOR ART
Figure 2:
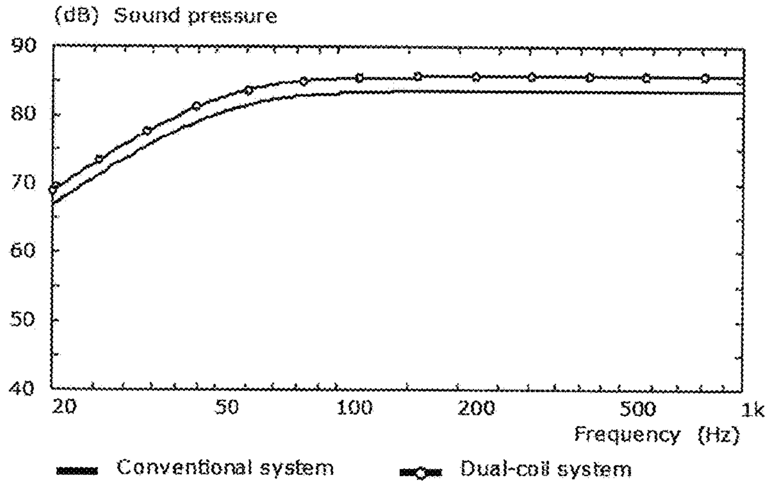
FIG. 2 is a sound pressure/frequency graph showing an example of a closed box loudspeaker using a conventional a single coil and a dual-coil system.
Figure 3:
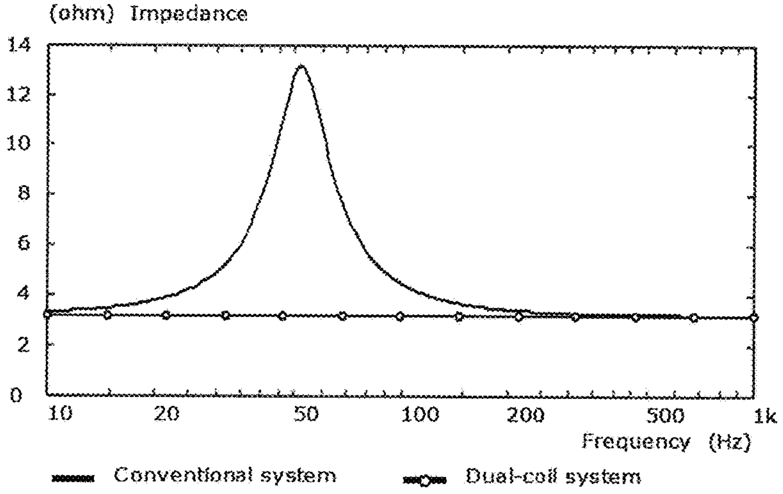
FIG. 3 is an impedance/frequency graph comparing the impedance of a closed box loudspeaker using a conventional a single coil and a dual-coil system.
Figure 4:
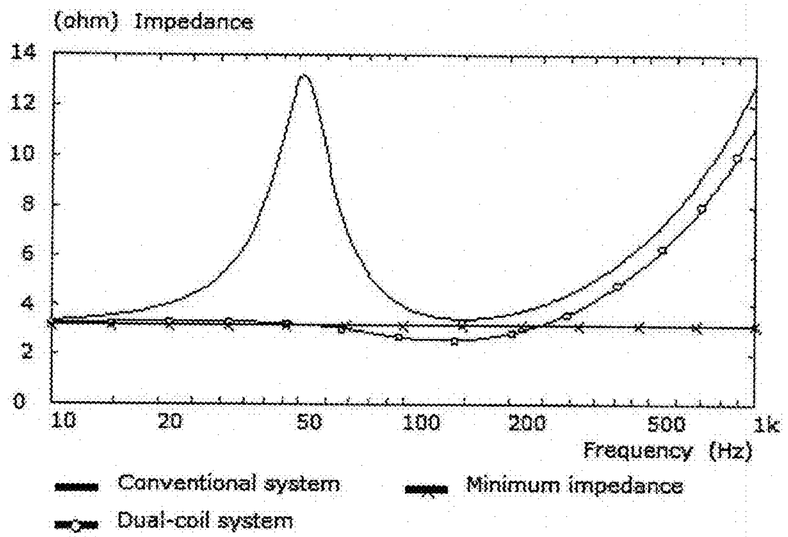
FIG. 4 is a graph giving a comparison of the loudspeaker impedance when the inductance is not ignored.
Figure 5:
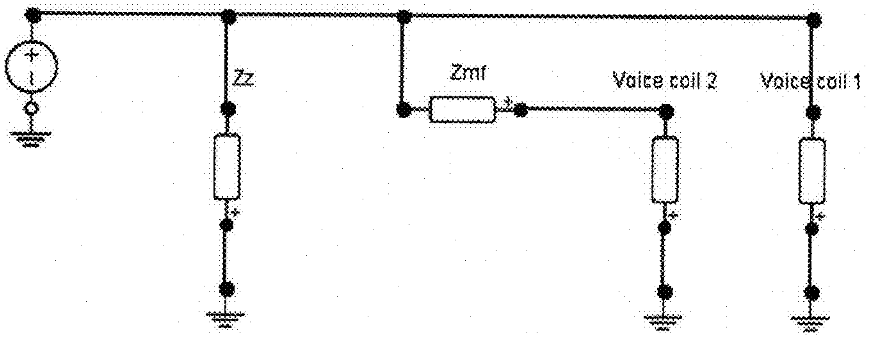
Fig 5 PRIOR ART
FIG. 5 shows the equivalent electrical circuit of the dual coil arrangement including a Zobel network $Z_z$.
Figure 6:
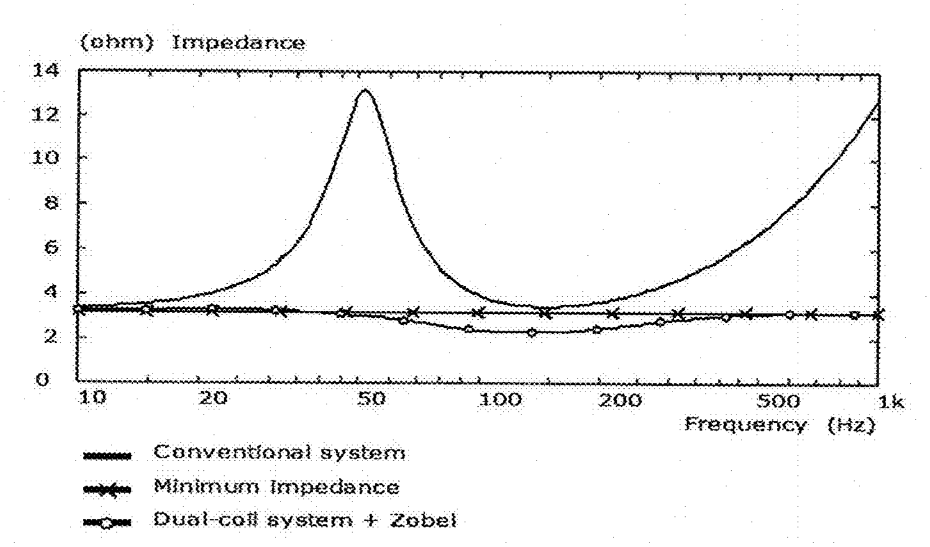
FIG. 6 is a plot of the loudspeaker impedance with and without a Zobel network.
Figure 7:
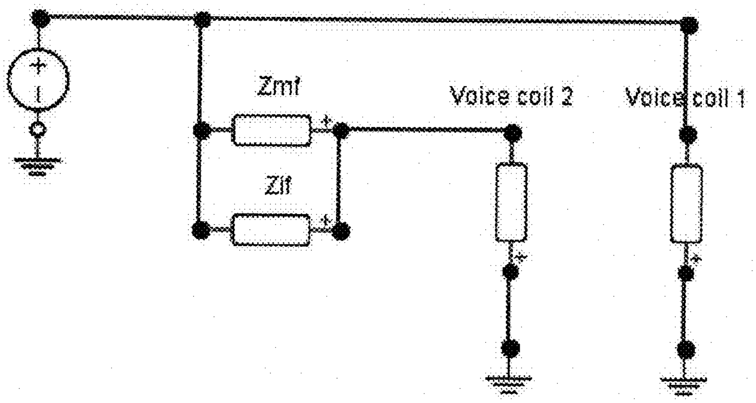
FIG. 7 is an electrical circuit in accordance with the invention to cancel the effect of the inductance of the primary and secondary voice coils.
Figure 8:
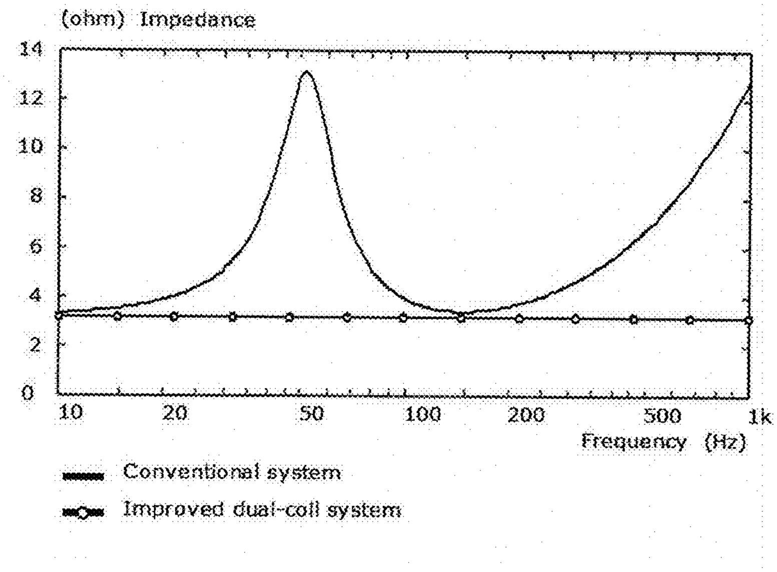
FIG. 8 is a comparison of the loudspeaker impedance of a conventional single coil system, and the impedance of the loudspeaker arrangement of FIG. 7.

FIG. 7 shows the basic circuit in accordance with the invention to cancel the effect of the voice coil inductance. It consists of an inductance compensation filter $Z_{if}$—typically but not exclusively, a capacitor in series with an optional resistor—in parallel to the original circuit $Z_{mf}$ driving the second voice coil, voice coil 2, which is driven in parallel with the primary voice coil, voice coil 1. FIG. 8 shows that when the circuit of FIG. 7 is used not only is the effect of the inductance annihilated (the monotonic rise at high frequencies), but more importantly no dip is present in the impedance.

Figure 9:
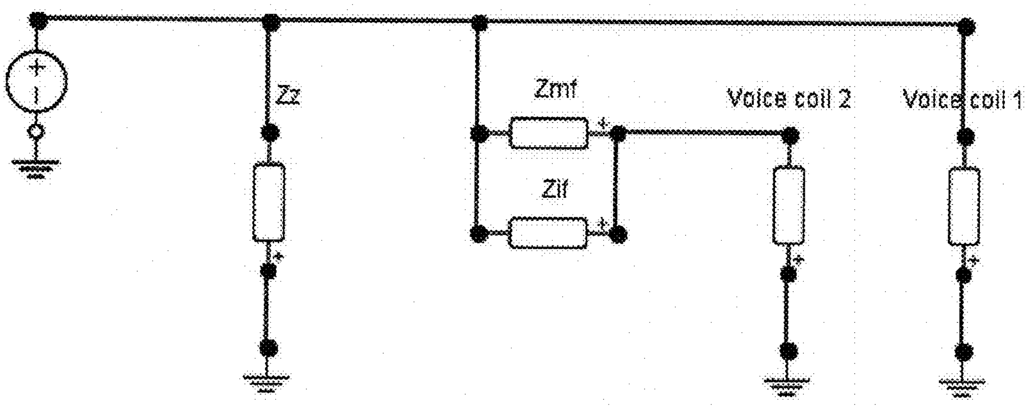
FIG. 9 is the electrical circuit of FIG. 7 including a Zobel network.

FIG. 9 shows the circuit of FIG. 7 adapted to cancel the effect of the inductance with a Zobel network $Z_z$ adapted to cancel the effect of any residual inductance.

The mathematical description of the system of the invention will now be described. The $Z_{mf}$ circuit compensates the mechanical load $Z_m$ seen by the loudspeaker. Its impedance is substantially $$Z_{mf}=Z_m(R_{el}/B\ell_l)^2$$

where $R_{el}$ and $B\ell_l$ are respectively the resistance (in ohms) and the force factor (in N/A) of the primary voice coil. Some adjustments are sometimes required to consider the resistance of the secondary voice coil, so in most embodiments better results and greater sensitivity may be achieved with a resistance value in the $Z_{mf}$ circuit lower than that given by the equation above.

The $Z_{if}$ circuit compensates the inductance of the loudspeaker. Its impedance is substantially $$Z_{if}=R_{el}^2/j\omega L_{el}(\omega)$$

where j is the imaginary operator, ω is the circular frequency and $L_{el(\omega}$ is the complex frequency-dependent inductance (in H) of the primary voice coil, where $$L_{el}(\omega)=(Z_{eb}(\omega)-Z_{eb}(0))/(j\omega)$$

and $Z_{eb}(\omega)$ is the frequency dependent blocked impedance and $Z_{eb}(0)$ is the DC blocked impedance.

The impedances $Z_{mf}$ and $Z_{if}$ being in parallel, the overall impedance $Z_{ef}$ of the circuit that is in series with secondary coil is therefore substantially $$Z_{ef}=Z_{mf}Z_{if}/(Z_{mf}+Z_{if})$$

Figure 10:
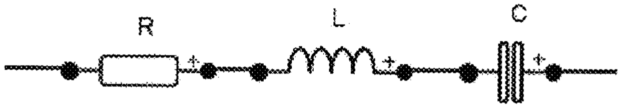
FIG. 10 is a passive circuit $Z_{mf}$ required for use of a dual-coil loudspeaker driver in free air, in a baffle or a closed box.
Figure 11:
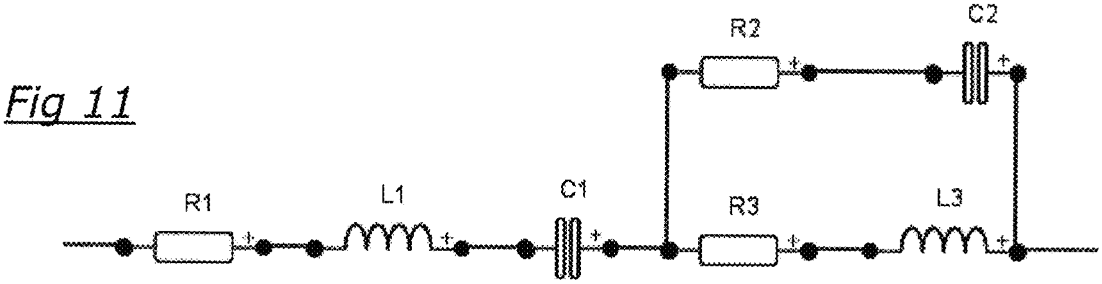
FIG. 11 is a passive circuit $Z_{mf}$ required for a dual-coil loudspeaker driver in a vented box.

The $Z_{mf}$ circuit compensates the mechanical load seen by the loudspeaker; therefore, its topology depends on the type of environment in which the loudspeaker is placed. If used in free air, in a baffle or a closed box, the RLC (resistor R inductor L capacitor C) circuit shown in FIG. 10 is sufficient to flatten the impedance. If the loudspeaker is used in a ported enclosure, the $Z_{mf}$ circuit is instead as shown in FIG. 11, and comprises: a first branch R1-L1-C1 that compensates the loudspeaker; a second branch R2-C2 that compensates the box, and a third branch R3-L3 that compensates the vent.

Figure 12:
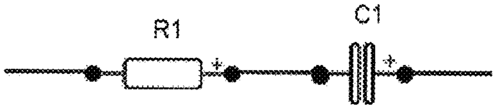
FIG. 12 is an example of a simple inductance-cancelling passive circuit $Z_{if}$.
Figure 13:
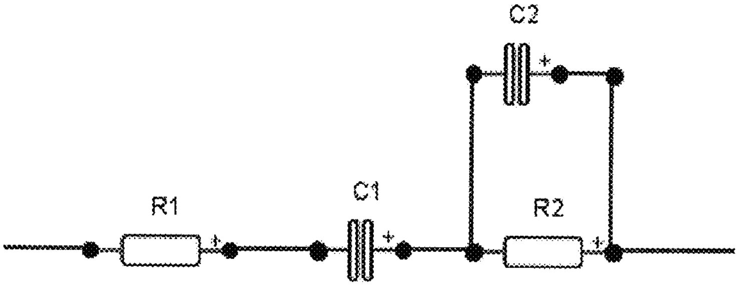
FIGS. 13 and 14 are examples of passive circuit $Z_{if}$ required for semi-inductance LR2 and LR3, respectively.
Figure 14:
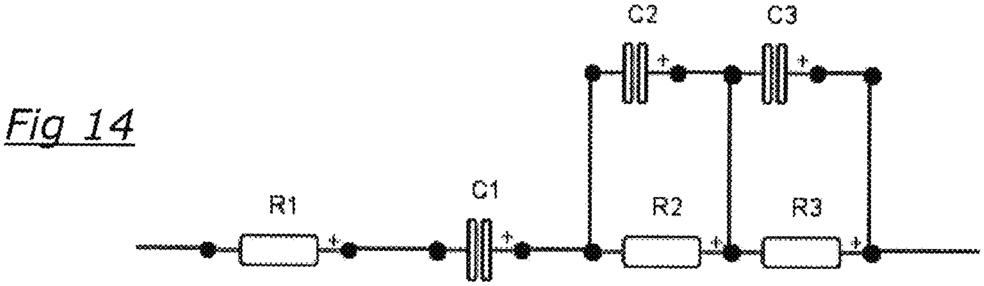

The $Z_{if}$ circuit compensates the inductance of the loudspeaker and is shown in FIG. 12. The simplest circuit uses a single capacitor C1 but sometimes a resistor R1 in series is needed for fine tuning. In certain circumstances, the inductance is frequency-dependent and it is required to use a so-called semi-inductance model, involving several branches. FIG. 13 and FIG. 14 show respectively compensation circuits LR2 and LR3 which are the most common semi-inductance models.

Figure 15:
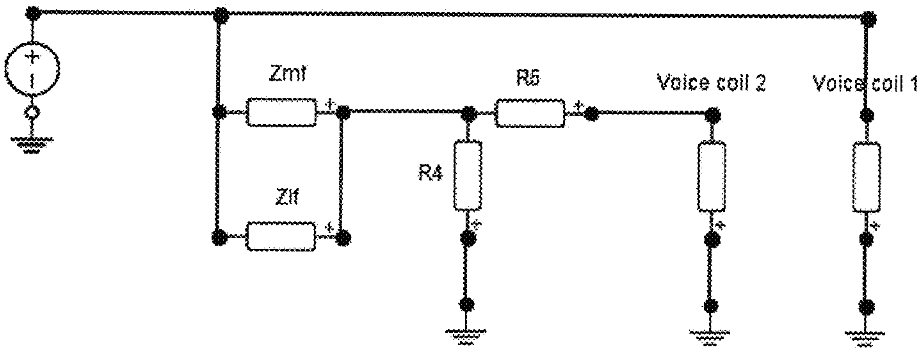
FIG. 15 shows the circuit of FIG. 7 incorporating a voltage divider R4-R5.
Figure 16:
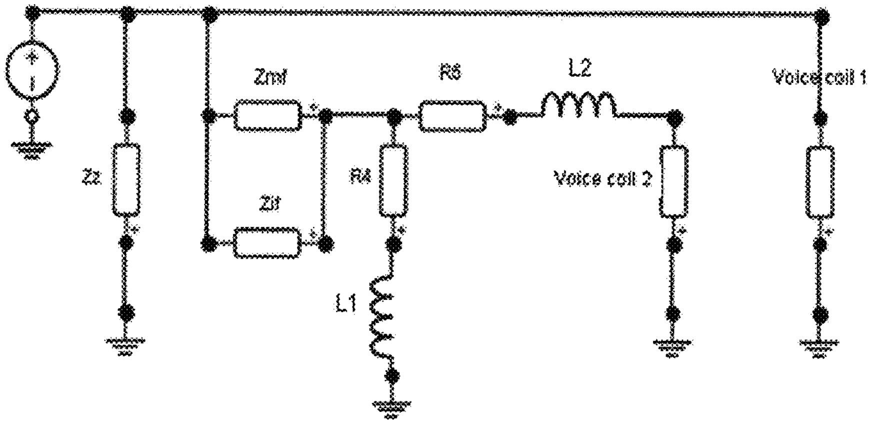
FIG. 16 shows the circuit of FIG. 15 when a Zobel network is used.
Figure 17:
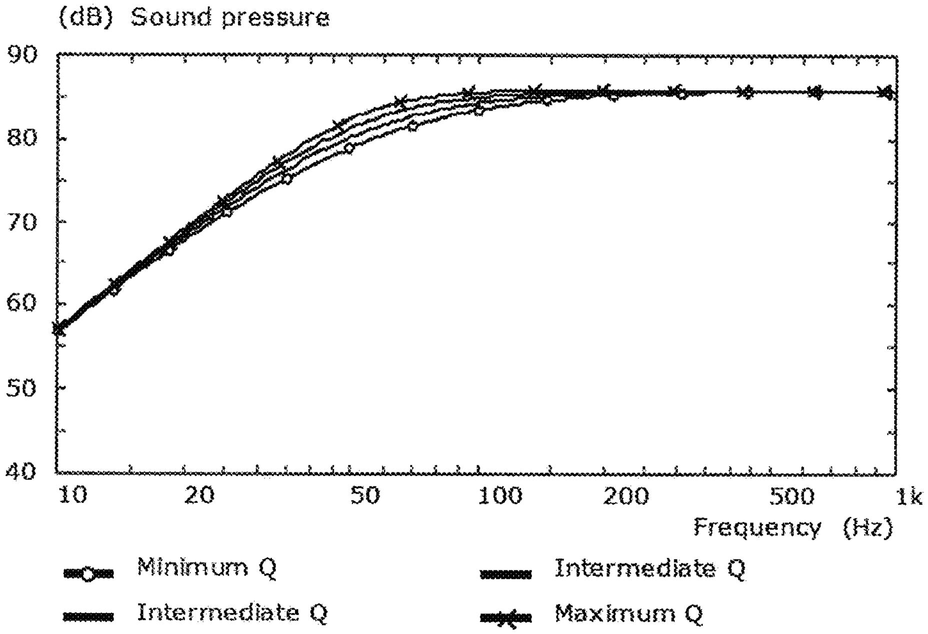
FIG. 17 shows the pressure response showing the control of the Q-factor enabled by the circuit of FIG. 15 or of FIG. 16.

The dual-coil arrangement gives an opportunity unachievable with a conventional single coil driver: the control of the Q-factor without changing the input impedance. The principle is to insert a voltage divider R4-R5 between the electrical circuit of impedance $Z_{ef}$ and the secondary voice coil, as shown in FIG. 15. When a Zobel network $Z_z$—typically a capacitor in series with a resistor—is used to compensate any residual effects of the inductance such as depicted in FIG. 9, the voltage divider may use two inductors L1 and L2 respectively in series with the resistors R4 and R5, as shown in FIG. 16. The effect, depicted in FIG. 17, is to allow control of the pressure response at low frequency, giving more flexibility for the user in the loudspeaker placement in a room for example.

Figure 18A:
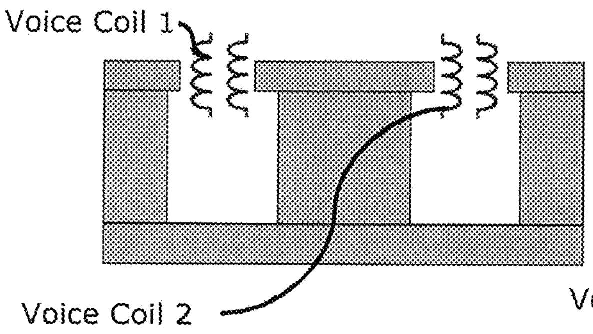
FIGS. 18(*a*) and 18(*b*) show single gap and dual-gap voice coil arrangements, respectively, and FIGS. 19(*a*) and 19(*b*) show single driver and dual-driver arrangements.
Figure 18B:
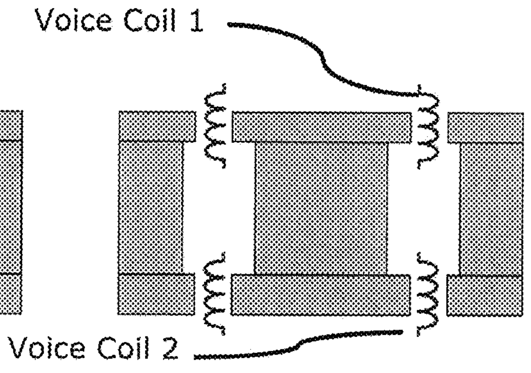
Figure 19A:
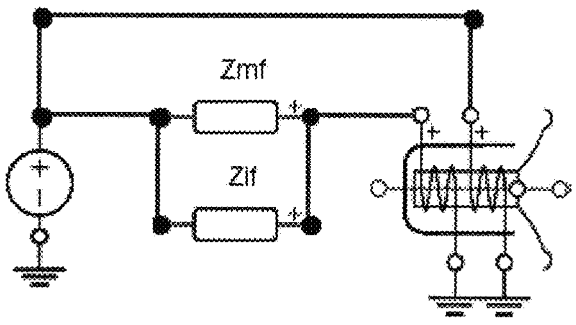
Figure 19B:
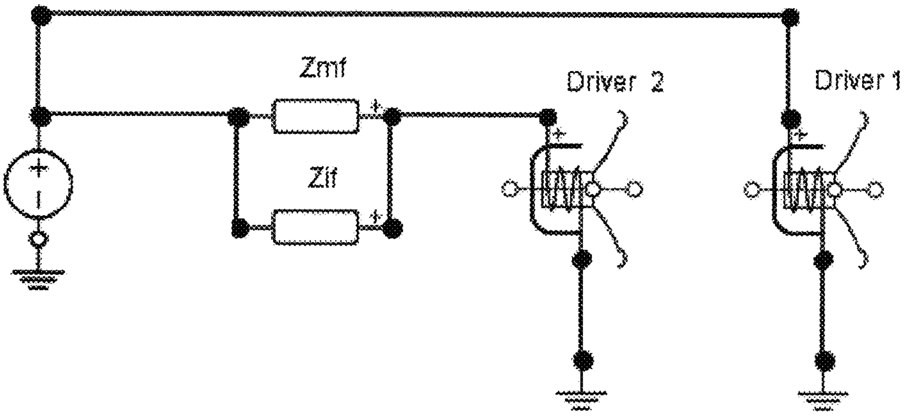

As in U.S. Pat. No. 3,838,216, the motor system described above uses a single magnetic gap shared by the two voice coils, as shown in FIG. 18*a*. An alternative is, while still using the same motor system, to use one gap per voice coil, as in FIG. 18*b*, where the diaphragm of the second voice coil is behind the diaphragm of the primary voice coil and radiates rearwardly. In the equivalent electrical circuits, two motors could drive the same diaphragm as in FIG. 19(*a*), or a small acoustic chamber could be placed between two drivers as in FIG. 19(*b*); the latter arrangement is an isobaric arrangement.

It will of course be understood that many variations may be made to the above-described embodiment without departing from the scope of the present invention. For example, the present invention is principally described with reference to circular voice coils (in the form of a substantially planar ring with a central hole); however, the invention applies equally to non-circular arrangements, such as oval, elliptical or race track shaped (figure of eight, or triangular/square/polygonal with rounded corners) voice coils, or any shape being symmetrical in one or two orthogonal directions lying in the general plane perpendicular to the voice coil axis and having a central hole.

Where different variations or alternative arrangements are described above, it should be understood that embodiments of the invention may incorporate such variations and/or alternatives in any suitable combination.

The invention claimed is:

1. Electrical circuitry adapted to drive a dual-coil loudspeaker having a primary voice coil and a second voice coil, the second voice coil being in series combination with a resonant circuit of impedance $Z_{mf}$ in parallel with an inductance compensation filter of impedance $Z_{if}$, the combination of second voice coil, resonant circuit and inductance compensation filter being connected in parallel with the primary voice coil, in which the inductance compensation filter comprises a capacitor.

2. Electrical circuitry according to claim 1, in which the impedance of the inductance compensation filter is given by $$Z_{if}=R_{el}^2/j\omega L_{el}(\omega)$$

where $R_{el}$ is the resistance of the primary voice coil, j is the imaginary operator, ω is the circular frequency and $L_{el}(\omega)$ is the frequency-dependent inductance of the primary voice coil, and where $$L_{el}(\omega)=(Z_{eb}(\omega)-Z_{eb}(0))/(j\omega),$$

$Z_{eb}(w)$ being the frequency dependent blocked impedance and $Z_{eb}(0)$ being the DC blocked impedance.

3. Electrical circuitry according to claim 1, in which the impedance of the resonant circuit is given by $$Z_{mf}=Z_m(R_{el}/B\ell_l)^2$$

where $Z_{mf}$ is the mechanical load seen by the loudspeaker, $R_{el}$ is the resistance of the primary voice coil and $B\ell_l$ is the force factor of the primary voice coil.

4. Electrical circuitry according to claim 1, in which the inductance compensation filter comprises a resistor R1 in series with the capacitor C1.

5. Electrical circuitry according to claim 1 in which the inductance compensation filter comprises the capacitor C1 in series with the resistor R1 and, in series, a further capacitor C2 in parallel with a resistor R2.

6. Electrical circuitry according to claim 5 in which the inductance compensation filter further comprises a further capacitor C3 in parallel with a further resistance R3.

7. Electrical circuitry according to claim 1, further comprising a voltage divider R4-R5 located in series between:

(i) the parallel-connected resonant circuit and the inductance compensation filter, and (ii) the second voice coil.

8. Electrical circuitry according to claim 1, further comprising a Zobel network in parallel with the primary voice coil and in parallel with the secondary voice coil, the resonant circuit and the inductance compensation filter.

9. Electrical circuitry according to claim 1, in which the primary and second voice coils are coaxial and share the same magnetic gap.

10. Electrical circuitry according to claim 9, in which the primary and second voice coils are separated by an acoustic chamber.

11. Electrical circuitry according to claim 1, in which the primary and second voice coils are coaxial and operate in separate magnetic gaps.

* * * * *